United States Patent [19]
Eichenauer et al.

[11] Patent Number: 5,969,041
[45] Date of Patent: Oct. 19, 1999

[54] HIGH-IMPACT ABS MOULDING COMPOSITIONS

[75] Inventors: Herbert Eichenauer, Dormagen; Adolf Schmidt, Köln; Heinrich Alberts, Odenthal, all of Germany

[73] Assignee: Bayer AG, Germany

[21] Appl. No.: 08/884,968

[22] Filed: Jun. 30, 1997

[30] Foreign Application Priority Data

Jul. 8, 1996 [DE] Germany ............... 196 27 423

[51] Int. Cl.⁶ .............. C08F 279/02; C08F 279/04; C08L 55/02
[52] U.S. Cl. ............... 525/71; 525/193; 525/316
[58] Field of Search ............... 525/316, 71, 193

[56] References Cited

U.S. PATENT DOCUMENTS

| | | | |
|---|---|---|---|
| 3,509,238 | 4/1970 | Aubrey et al. . | |
| 3,928,494 | 12/1975 | Aliberti . | |
| 4,767,833 | 8/1988 | Yumoto et al. | 525/193 |
| 5,041,498 | 8/1991 | Hare et al. | 525/71 |
| 5,254,622 | 10/1993 | Nanasawa et al. | 525/80 |
| 5,367,021 | 11/1994 | Roovers et al. | 525/67 |
| 5,430,100 | 7/1995 | Dotson et al. | 525/71 |
| 5,674,940 | 10/1997 | Eichenauer et al. . | |
| 5,718,232 | 2/1998 | Schmidt et al. | 525/71 |
| 5,741,853 | 4/1998 | Eichenauer et al. | 525/71 |

FOREIGN PATENT DOCUMENTS

| | | |
|---|---|---|
| 0116330 | 8/1984 | European Pat. Off. . |
| 678 531 | 10/1995 | European Pat. Off. . |
| 1 813 719 | 7/1969 | Germany . |

OTHER PUBLICATIONS

European Search Report for related foreign application EP 09 11 0359 (Jul. 3, 1998).

Primary Examiner—Jeffrey C. Mullis
Attorney, Agent, or Firm—Connolly Bove Lodge & Hutz LLP

[57] ABSTRACT

This invention relates to graft polymers of the ABS type which are produced in emulsion, and to thermoplastic molding compositions which are based thereon and which exhibit a very considerably increased notched bar impact strength compared with known ABS molding compositions and which at the same time exhibit high hardness values or high modulus values and good thermoplastic processability.

20 Claims, No Drawings

HIGH-IMPACT ABS MOULDING COMPOSITIONS

BACKGROUND OF THE INVENTION

1. Field of the Invention

This invention relates to graft polymers of the ABS type which are produced in emulsion, and to thermoplastic moulding compositions which are based thereon and which exhibit a very considerably increased notched bar impact strength compared with known ABS moulding compositions and which at the same time exhibit high hardness values or high modulus values and good thermoplastic processability.

2. Description of the Prior Art

ABS moulding compositions are two-phase synthetic materials comprising:

I: a thermoplastic copolymer of styrene and acrylonitrile, in which the styrene may be completely or partially replaced by α-methyl styrene or methyl methacrylate; this copolymer, which is also termed SAN resin or matrix resin, forms the external phase;

II: at least one graft polymer, which has been produced by a graft reaction of one or more of the monomers cited in I. on to a butadiene homo- or copolymer ("graft base"). This graft polymer ("elastomer phase" or "graft rubber") forms the disperse phase in the matrix resin.

For the same matrix, the toughness of an ABS moulding composition is substantially determined by the graft rubber contained therein. However, the toughness which can be obtained, with the requisite reliability, using customary ABS moulding compositions is not always sufficient for highly stressed mouldings, or high toughness values are obtained, but to the detriment of other properties of the mouldings.

There is therefore a need for highly effective graft rubbers, based on which ABS moulding compositions having a very high toughness can be produced without their other properties being altered in a negative sense.

It has now been found that with the simultaneous use of a special mixture of at least two accurately defined rubber latices and defined added amounts of special radical initiator compounds and emulsifiers during the production of the graft rubber, and preferably with the maintenance of special reaction conditions, ABS moulding compositions which have very high impact toughness values can be obtained.

The use of rubber latex mixtures in the production of graft rubbers for ABS moulding compositions is in fact known, although the quality requirements are not fulfilled.

Thus, for example, tough ABS moulding compositions which exhibit good processability are known from DE-AS 1 813 719; these are obtained by the single-stage emulsion graft polymerisation, which proceeds under pressure, of 75 to 90 parts by weight of a monomer mixture on to 10 to 25 parts by weight of a mixture of two rubber latices, one of which is a pure polybutadiene and the other is an SBR latex with a styrene content <50% and with a defined particle size.

U.S. Pat. No. 3,509,238 describes ABS products which are produced using two graft polymers, one of which is weakly grafted, the other of which is strongly grafted. These products have unsatisfactory properties at low temperatures, however.

U.S. Pat. No. 3,928,494 describes ABS products comprising two graft polymers comprising different degrees of grafting, in which the more weakly grafted, finely divided material is layered together during spray-drying or during coagulation to form particle aggregates. Aggregates of this type constitute loosely bound formations which are torn apart again under the action of high temperatures and shear forces, such as those which can occur in injection moulding processing for example, and do not then result in satisfactory product toughnesses.

EP-A 116 330 describes ABS moulding compositions based on two different butadiene polymers, with a special grafting site spacing of the graft polymers produced from the butadiene polymers. These products in fact exhibit good toughness at room temperature, but their hardness values and their thermoplastic flowability are not adequate for severe demands.

SUMMARY OF THE INVENTION

The present invention relates to thermoplastic moulding compositions of the ABS type, comprising I) at least one graft polymer, obtained by the emulsion polymerisation of styrene and acrylonitrile in a weight ratio of 90:10 to 50:50, wherein styrene and/or acrylonitrile can be completely or partially replaced by α-methylstyrene, methyl methacrylate or N-phenylmaleinimide, in the presence of at least two butadiene polymer latices of type (A) and (B), which each contain 0 to 50% by weight of a further copolymerised vinyl monomer and wherein the weight ratio of the monomers used to the butadiene polymers used is 20:80 to 80:20, preferably 30:70 to 75:25, and II) at least one copolymer of styrene and acrylonitrile in a weight ratio of 90:10 to 50:50, wherein styrene and/or acrylonitrile can be completely or partially replaced by α-methylstyrene, methyl methacrylate or N-phenylmaleinimide, characterised in that i) butadiene polymer latex (A) has a particle diameter $d_{50} \leq 320$ nm, preferably 260 to 310 nm, a particle size distribution range (measured as $d_{90}-d_{10}$ from the integral particle size distribution) from 30 to 100 nm, preferably from 40 to 80 nm, and a gel content $\leq 70\%$ by weight, preferably 40 to 65% by weight, and butadiene polymer latex (B) has a particle diameter $d_{50} \leq 370$ nm, preferably 380 to 450 nm, a particle size distribution range (measured as $d_{90}-d_{10}$ from the integral particle size distribution) from 50 to 500 nm, preferably from 100 to 400 nm, and a gel content $\leq 70\%$ by weight, preferably 75 to 90% by weight, ii) at least one compound of general formula R

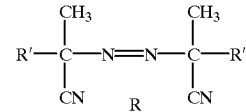

wherein $R'=C_2H_5, C_3H_7, C_4H_9$, is used in amounts of 1 to 5% by weight, preferably 1.5 to 3% by weight (with respect to the monomers in each case) as a radical former for the production of the graft polymer, and iii) the weight ratio of radical former R:emulsifier which is used in the graft polymerisation is 1:1 to 1:5, preferably 1:1 to 1:3.

DESCRIPTION OF THE PREFERRED EMBODIMENTS

The graft polymerisation is preferably conducted by feeding the monomers into the mixture of butadiene polymer latices (A) and (I3) in such a way that 55 to 90% by weight, preferably 60 to 80% by weight, and most preferably 65 to 75% by weight of the monomers are added during the first half of the monomer feed period.

In a further preferred embodiment of the present invention, the graft polymerisation is conducted by feeding in the monomers and adding the initiator together with the emulsifier solution in a separate feeding operation.

Apart from the polymer resin components cited above, the moulding compositions according to the invention may contain other, rubber-free thermoplastic resins which are not synthesised from vinyl monomers.

A mixture of at least two butadiene polymer latices, one of type (A) and one of type (B), is used for the graft polymerisation. The weight ratio of (A):(B) with respect to the respective solids content of the latex is preferably 90:10 to 10:90, most preferably 60:40 to 30:70.

Butadiene polymer latices (A) and (B) can be produced by the emulsion polymerisation of butadiene. This polymerisation is known, and is described, for example, in Houben-Weyl, Methoden der Organischen Chemie, Makromolekulare Stoffe, Part 1, page 674 (1961), Thieme Verlag Stuttgart. Up to 50% by weight (with respect to the total amount of monomer used for the production of the butadiene polymer) of one or more monomers which are copolymerisable with butadiene can be used as comonomers.

Examples of monomers such as these include isoprene, chloroprene, acrylonitrile, styrene, α-methylstyrene, $C_1$–$C_4$ alkyl styrenes, $C_1$–$C_8$ alkyl acrylates, $C_1$–$C_8$ alkyl methacrylates, alkylene glycol diacrylates, alkylene glycol dimethacrylates and divinylbenzene; butadiene is preferably used on its own. It is also possible firstly to produce a finely divided butadiene polymer by known methods and subsequently to agglomerate it in the known manner to produce the requisite particle size.

Relevant techniques have been described (see EP-PS 0 029 613; EP-PS 0 007 810; DD-PS 144 415; DE-AS 1 233 131; DE-AS 1 258 076; DE-OS 2 101 650; U.S. Pat. No. 1,379,391).

What is termed the seed polymerisation technique can also be employed, in which a finely divided butadiene polymer is first produced and is then polymerised further to form larger particles by further reaction with monomers containing butadiene.

In principle, butadiene polymer latices (A) and (B) can also be produced by the emulsification of finely divided butadiene polymers in aqueous media (see Japanese Patent Application 55 125 102).

Butadiene polymer latex (A) has an average particle diameter $d_{50} \leq 320$ nm, preferably 260 to 310 nm, a particle size distribution range (measured as $d_{90}$–$d_{10}$ from the integral particle size distribution) from 30 to 100 nm, preferably from 40 to 80 nm, and a gel content $\leq 70\%$ by weight, preferably 40 to 65% by weight.

Butadiene polymer latex (B) has a particle diameter $d_{50} \geq 370$ nm, preferably 380 to 450 nm, a particle size distribution range (measured as $d_{90}$–$d_{10}$ from the integral particle size distribution) from 50 to 500 nm, preferably from 100 to 400 nm, and a gel content $\geq 70\%$ by weight, preferably 75 to 90% by weight.

Determination of the average particle diameter $d_{50}$ and of the $d_{10}$ and $d_{90}$ values can be effected by ultracentrifuge measurements (see W. Scholtan, H. Lange: Kolloid Z. u. Z. Polymere 250, pages 782 to 796 (1972)); the values given for the gel content are based on a determination by the wire cage method in toluene (see Houben-Weyl, Methoden der Organischen Chemie, Makromolekulare Stoffe, Part 1, page 307 (1961), Thieme Verlag Stuttgart).

The gel contents of butadiene polymer latices (A) and (B) can be adjusted, in a manner which is known in principle, by employing suitable reaction conditions (e.g. a high reaction temperature and/or polymerisation up to a high conversion, and optionally the addition of substances with a crosslinking action in order to obtain a high gel content, or, for example, a low reaction temperature and/or termination of the polymerisation reaction before the occurrence of too strong a crosslinking effect and optionally with the addition of molecular weight regulators such as n-dodecyl mercaptan or t-dodecyl mercaptan, for example, in order to obtain a low gel content). The usual anionic emulsifiers can be used as emulsifiers, such as alkyl sulphates, alkyl sulphonates, aralkyl sulphonates, soaps of saturated or unsaturated fatty acids, as well as alkaline disproportionated or hydrogenated abietic or tall oil acids; emulsifiers containing carboxyl groups (e.g. salts of $C_{10}$–$C_{18}$ fatty acids, disproportionated abietic acid) are preferably used.

The graft polymerisation may be conducted by continuously adding the monomer mixture, so that it is continuously polymerised, to the mixture of butadiene polymer latices (A) and (B).

In the course of this operation, particular monomer:rubber ratios and a defined procedure for the addition of monomer to the rubber latex are preferably adhered to.

In order to produce the products according to the invention, preferably 25 to 70 parts by weight, most preferably 30 to 60 parts by weight, of a mixture of styrene and acrylonitrile which may optionally contain up to 50% by weight (with respect to the total amount of monomers used in the graft polymerisation) of one or more comonomers, are polymerised in the presence of what is preferably 30 to 75 parts by weight, most preferably 40 to 70 parts by weight (with respect to the solid in each case) of the butadiene latex mixture of (A) and (B).

The monomers used in this graft polymerisation are preferably mixtures of styrene and acrylonitrile in a weight ratio of 90:10 to 50:50, most preferably in a weight ratio of 65:35 to 75:25, wherein styrene and/or acrylonitrile can be completely or partially replaced by copolymerisable monomers, preferably by α-methylstyrene, methyl methacrylate or N-phenylmaleinimide.

Molecular weight regulators can be used in addition in the graft polymerisation, preferably in amounts of 0.05 to 3% by weight, most preferably in amounts of 0.1 to 2% by weight (with respect to the total amount of monomer in the graft polymerisation stage in each case).

Examples of suitable molecular weight regulators include n-dodecyl mercaptan, t-dodecyl mercaptan, dimeric α-methylstyrene, and terpineols.

Compounds of general formula

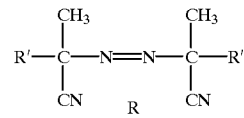

wherein R'=$C_2H_5$, $C_3H_7$, $C_4H_9$, and wherein the isomeric radicals n-$C_3H_7$, i-$C_3H_7$, n-$C_4H_9$, i-$C_4H_9$, t-$C_4H_9$ are included, are suitable as radical formers for the graft polymerisation; a compound R where R'=$C_2H_5$ is particularly preferred.

The radical formers are preferably used in amounts of 1 to 5% by weight, preferably 1.5 to 3% by weight (with respect to the monomers used in each case).

The reaction temperature is 40° C. to 120° C., preferably 45° C. to 100° C., and most preferably 50° C. to 90° C.

The aforementioned compounds can be used as emulsifiers; emulsifiers containing carboxyl groups are preferred.

In order to achieve the effect of a very high toughness according to the invention, the amounts of emulsifier used in the graft reaction must be selected so that the weight ratio of radical former:emulsifier does not exceed a value of about 1:0.9. A weight ratio of radical former R:emulsifier of 1:1 to 1:5 is preferably used, most preferably of 1:1 to 1:3.

In order to produce the products according to the invention, the graft polymerisation is preferably conducted by feeding in the monomers in such a way that 55 to 90% by weight, preferably 60 to 80% by weight, and most preferably 65 to 75% by weight of the total monomers to be used in the graft polymerisation are added during the first half of the total monomer feed period; the remaining proportion of monomers is added over the second half of the total monomer feed period.

Finally, the graft polymer produced is mixed with at least one thermoplastic resin. This can be effected in various ways. If the thermoplastic resin itself has been produced by emulsion polymerisation, the latices can be mixed, and can be jointly precipitated and worked up. If the thermoplastic resin has been produced by solution or bulk polymerisation, the graft polymer must be isolated by known methods, for example by spray-drying or by the addition of salts and/or acids, washing the precipitated products and drying the powder, and thereafter is mixed with the thermoplastic resin, which preferably exists in the form of granules (preferably in multi-cylinder mills, mixing extruders or internal kneaders); this method is preferably employed.

Copolymers of styrene and acrylonitrile in a weight ratio of 90:10 to 50:50 are preferably used as the vinyl resins, wherein styrene and/or acrylonitrile can be replaced completely or partially by α-methylstyrene and/or methyl methacrylate; proportions of up to 30% by weight with respect to the vinyl resin, of a further monomer from the series comprising maleic anhydride, maleic acid imide, N-(cyclo)-alkylmaleinimide or N-(alkyl)-phenylmaleinimide may optionally be used in conjunction.

Details of the production of these resins are described in DE-AS 2 420 358 and DE-AS 2 724 360, for example. Vinyl resins produced by bulk or solution polymerisation have proved to be particularly suitable.

Apart from thermoplastic resins of this type, which are synthesised from vinyl monomers, it is also possible to use aromatic polycarbonates, aromatic polyester carbonates, polyesters or polyamides, for example, as resin components in the moulding compositions according to the invention.

Suitable thermoplastic polycarbonates or polyester carbonates are known (see DE-AS 1 495 626, DE-OS 2 232 877, DE-OS 2 703 376, DE-OS 2 714 544, DE-OS 3 000 610, DE-OS 3 832 396, DE-OS 3 077 934, for example), and can be produced, for example, by the reaction of diphenols of formulae (I) and (II)

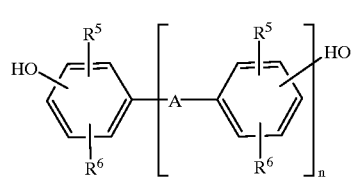

(I)

-continued

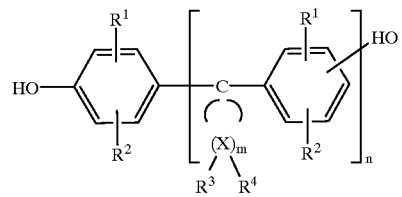

(II)

wherein
A a single bond, a $C_1$–$C_5$ alkylene, a $C_2$–$C_5$ alkylidene, a $C_5$–$C_6$ cycloalkylidene, —O—, —S—, —SO—, —$SO_2$— or —CO—, $R^5$ and $R^6$ represent, independently of each other, hydrogen, methyl or a halogen, particularly hydrogen, methyl, chlorine or bromine, $R^1$ and $R^2$ denote, independently of each other, hydrogen, a halogen, preferably chlorine or bromine, a $C_1$–$C_8$ alkyl, preferably methyl or ethyl, a $C_5$–$C_6$ cycloalkyl, preferably cyclohexyl, a $C_6$–$C_{10}$ aryl, preferably phenyl, or a $C_7$–$C_{12}$ aralkyl, preferably a phenyl-$C_1$–$C_4$ alkyl, particularly benzyl, m is an integer from 4 to 7, preferably 4 or 5, n is 0 or 1, $R^3$ and $R^4$ can be selected individually for each X and denote, independently of each other, hydrogen or a $C_1$–$C_6$ alkyl, and X denotes carbon, with carbonic acid halides, preferably phosgene, and/or with aromatic dicarboxylic acid halides, preferably benzene dicarboxylic acid halides, by the phase boundary process, or with phosgene by the homogeneous phase process (the so-called pyridine process), wherein the molecular weight can be adjusted in the known manner by a corresponding amount of known chain terminators.

Examples of suitable diphenols of formulae (I) and (II) include hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4,4,-trimethylcyclopentane.

The preferred diphenols of formula (I) are 2,2-bis-(4-hydroxyphenyl)-propane and 1,1-bis-(4-hydroxyphenyl)-cyclohexane; the preferred phenol of formula (II) is 1,1-bis-(4-hydroxyphenyl)-3,3,5-trimethylcyclohexane.

Mixtures of diphenols can also be used.

Examples of suitable chain terminators include phenol, p-tert.-butylphenol, long chain alkyl phenols such as 4-(1,3-tetramethyl-butyl)phenol according to DE-OS 2 842 005, monoalkyl phenols, dialkylphenols containing a total of 8 to 20 C atoms in their alkyl substituents according to DE-OS 3 506 472, such as p-nonylphenol, 2,5-di-tert- butylphenol, p-tert.-octylphenol, p-dodecylphenol, 2-(3,5-dimethylheptyl)-phenol and 4-(3,5-dimethylheptyl)-phenol. The requisite amount of chain terminators is generally 0.5 to 10 mole % with respect to the sum of diphenols (I) and (II).

Suitable polycarbonates or polyester carbonates may be linear or branched; branched products are preferably obtained by the incorporation of 0.05 to 2.0 mole %, with respect to the sum of the diphenols used, of trifunctional compounds or compounds with a functionality greater than three, e.g. those containing three or more than three phenolic OH groups.

Suitable polycarbonates or polyester carbonates may contain an aromatically bonded halogen, preferably bromine and/or chlorine; they are preferably halogen-free.

They have average molecular weights ($M_W$, weight average), as determined by ultracentrifuging or by the measurement of scattered light, of 10,000 to 200,000, preferably from 20,000 to 80,000.

Suitable thermoplastic polyesters are preferably polyalkylene terephthalates, namely reaction products of aromatic dicarboxylic acids or reactive derivatives thereof (e.g. dimethyl esters or anhydrides) and aliphatic, cycloaliphatic or arylaliphatic diols, and mixtures of reaction products such as these.

The preferred polyalkylene terephthalates can be produced by known methods from terephthalic acids (or reactive derivatives thereof) and aliphatic or cycloaliphatic diols containing 2 to 10 C atoms (Kunststoff-Handbuch, Volume VIII, page 695 et seq., Carl Hanser Verlag, Munich 1973).

In the preferred polyalkylene terephthalates, 80 to 100, preferably 90 to 100 mole % of the dicarboxylic acid radicals are terephthalic acid radicals, and 80 to 100, preferably 90 to 100 mole % of the diol radicals are ethylene glycol and/or 1,4-butanediol radicals.

Apart from ethylene glycol or 1,4-butanediol radicals, the preferred polyalkylene terephthalates may contain 0 to 20 mole % of radicals of other aliphatic diols containing 3 to 12 C atoms or of cycloaliphatic diols containing 6 to 12 C atoms, e.g. radicals of 1,3-propanediol, 2-ethyl-1,3-propanediol, neopentyl glycol, 1,5-pentanediol, 1,6-hexanediol, cyclohexane-di-1,4-methanol, 3-methyl-1,3-pentanediol and -1,6-pentanediol, 2-ethyl-1,3-hexanediol, 2,2-diethyl-1,3-propanediol, 2,5-hexanediol, 1,4-di(β-hydroxy-ethoxy)-benzene, 2,2,-bis-4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates can be branched by the incorporation of relatively small amounts of tri- or tetrahydric alcohols or of tri- or tetrabasic carboxylic acids, such as those which are described in DE-OS 1 900 270 and U.S. Pat. No. 3,692,744. Examples of preferred branching agents include trimesic acid, trimellitic acid, trimethylolethane and -propane, and pentaerythritol. It is advisable to use not more than 1 mole % of the branching agent with respect to the acid component.

The polyalkylene terephthalates which are particularly preferred are those which have been produced solely from terephthalic acid and reactive derivatives thereof (e.g. dialkyl esters thereof) and ethylene glycol and/or 1,4-butanediol, and mixtures of these polyalkylene terephthalates.

The preferred polyalkylene terephthalates also include copolyesters which are produced from at least two of the aforementioned alcohol components: poly-(ethylene glycol-1,4-butanediol)-terephthalates are particularly preferred copolyesters.

The preferred polyalkylene terephthalates which are suitable generally have an intrinsic viscosity of 0.4 to 1.5 dl/g, preferably 0.5 to 1.3 dl/g, particularly 0.6 to 1.2 dl/g, measured in each case in phenol-chlorobenzene (1:1 parts by weight) at 25° C.

Suitable polyamides comprise known homopolyamides, copolyamides and mixtures of these polyamides. These may be partially crystalline and/or amorphous polyamides.

Polyamide-6, polyamide-6,6, and mixtures and corresponding copolymers of these components are suitable as partially crystalline polyamides. Partially crystalline polyamides are also suitable in which the acid component completely or partially consists of terephthalic acid and/or isophthalic acid and/or suberic acid and/or sebacic acid and/or azelaic acid and/or adipic acid and/or cyclohexanedicarboxylic acid, the diamine component of which completely or partially consists of m- and/or p-xylylene-diamine and/or hexamethylenediamine and/or 2,2,4-trimethylhexamethylenediamine and/or 2,2,4-trimethylhexamethylenediamine and/or isophoronediamine, and the composition of which is known in principle.

Polyamides are also suitable which are produced completely or partially from lactams with 7–12 C atoms in their ring, optionally with the use in conjunction of one or more of the aforementioned starting components.

The polyamides which are particularly preferred are polyamide-6 and polyamide-6,6 and mixtures thereof. Known products can be used as amorphous polyamides. They are obtained by the condensation polymerisation of diamines such as ethylenediamine, hexamethylenediamine, decamethylenediamine, 2,2,4- and/or 2,4,4-trimethylhexamethylenediamine, m, - and/or p-xylylene-diamine, bis-(4-aminocyclohexyl)-methane, bis-(4-aminocyclohexyl)-propane, 3,3'-dimethyl-4,4'-aminodicyclohexylmethane, 3-aminomethyl,3,5,5,-trimethylcyclohexylamine, 2,5- and/or 2,6-bis-(aminomethyl)-norbornane and/or 1,4-diaminomethylcyclohexane with dicarboxylic acids such as oxalic acid, adipic acid, azelaic acid, azelaic acid, decane-dicarboxylic acid, heptadecane-dicarboxylic acid, 2,2,4-and/or 2,4,4-trimethyladipic acid, isophthalic acid and terephthalic acid.

Copolymers which are obtained by the condensation polymerisation of a plurality of monomers are also suitable, as are copolymers which are produced with the addition of amino-carboxylic acids such as ε-aminocaproic acid, ω-aminoundecanoic acid or ω-aminolauric acid or lactams thereof.

Amorphous polyamides which are particularly suitable are the polyamides produced from isophthalic acid, hexamethylenediamine and other diamines such as 4,4'-diaminodicyclohexylmethane, isophoronediamine, 2,2,4- and/or 2,4,4-trimethylhexanethylenediangine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurolactam; or from terephthalic acid and the mixture of isomers comprising 2,2,4- and/or 2,4,4-trimethylhexamethylenediamine.

Instead of pure 4,4'-diaminodicyclohexylmethane, mixtures of the positional isomers of diaminodicyclohexylmethane can also be used which comprise 70 to 99 mole % of the 4,4'-diamino isomer, 1 to 30 mole % of the 2,4'-diamino isomer, 0 to 2 mole % of the 2,2'-diamino isomer, and optionally of correspondingly higher condensed diamines which are obtained by the hydrogenation of diaminodiphenylmethane of industrial quality. Up to 30% of the isophthalic acid may be replaced by terephthalic acid.

The polyamides preferably have a relative viscosity (measured on a 1% by weight solution in m-cresol at 25° C.) from 2.0 to 5.0, most preferably from 2.5 to 4.0.

The proportion of graft rubber in the moulding compositions according to the invention can be varied within wide limits; it is preferably 10 to 80% by weight, most preferably 20 to 75% by weight.

The requisite or advisable additives may be added to the moulding compositions according to the invention during their production, work-up, further processing and final moulding, e.g. antioxidants, UV stabilisers, peroxide destroyers, antistatic agents, slip additives, demoulding agents, flame retardants, fillers or reinforcing agents (glass fibres, carbon fibres, etc.) and colorants.

Final moulding can be effected in customary processing units, and comprises injection moulding processing, sheet extrusion, optionally with subsequent thermoforming, cold forming, extrusion of tubes and sections and calendering for example.

The parts quoted in the following examples are always parts by weight, and the percentages quoted are always percentages by weight, unless indicated otherwise.

EXAMPLES

Examples 1 to 7

20 parts by weight (calculated as the solid) of an anionically emulsified polybutadiene latex which was produced by radical polymerisation (latex A), which had a $d_{50}$ value of 271 nm, a $d_{90}$–$d_{10}$ value of 43 nm and a gel content of 51% by weight, and 20 parts by weight (calculated as the solid) of an anionically emulsified polybutadiene latex which was produced by radical polymerisation (latex B), which had a $d_{50}$ value of 434 nm, a $d_{90}$–$d_{10}$ value of 111 nm and a gel content of 85% by weight, were made up with water to a solids content of about 20% by weight, after which the mixture was heated to 63° C. and treated with the initiators given in Table 1. Thereafter, 60 parts by weight of a mixture of 73% by weight styrene and 27% by weight acrylonitrile and 0.15 parts by weight tert-dodecyl mercaptan were added over 4 hours, in such a way that 70% by weight of the total amount of monomers was added to the reaction mixture within the first two hours; in parallel with this, the amounts given in Table I (calculated as the solid substance) of the sodium salt of a resin acid mixture (Dresinate 731, dissolved in water made alkaline) were added over 4 hours.

After a subsequent reaction time of 4 hours, the graft latices were each coagulated, after the addition of about 1.0 parts by weight of a phenolic antioxidant, by the addition of a magnesium sulphate/acetic acid mixture, and after washing with water the resulting powders were dried at 70° C. in vacuum.

40 parts by weight of the respective graft polymer were mixed with 60 parts by weight of a styrene/acrylonitrile copolymer resin (72:28, $M_W \approx 115{,}000$, $M_W/M_n - 1 \leq 2$), 2 parts by weight of ethylenediamine-bis-stearylamide and 0.1 parts by weight of a silicone oil in an internal kneader and were subsequently processed to form test bars.

The following data were determined:

The notched bar impact strength at room temperature according to ISO 180/1A (units: $kJ/m^2$), the indentation hardness ($H_c$) according to DIN 53 456 (units: $N/mm^2$), the thermal deformation resistance (Vicat B) according to DIN 53 460 (units: °C.), and the thermoplastic processability, by determining the requisite filling pressure at 240° C. (see F. Johannaber, Kunststoffe 74 (1984), 1, pages 2 to 5).

The results are summarised in Table 2. It can be seen from these results that it is only the moulding compositions according to the invention which exhibit very high toughnesses without negative effects on their other properties.

TABLE 1

Amount and type of initiators used, and amounts of emulsifiers used

| Example | Type of initiator | Amount of initiator [parts by weight] | Amount of emulsifier [parts by weight] |
|---|---|---|---|
| 1 | R with R' = $C_2H_5$ *) | 1 | 1 |
| 2 | R with R' = $C_2H_5$ *) | 1 | 1.5 |
| 3 | R with R' = $C_2H_5$ *) | 1 | 2 |
| 4 (comparative) | R with R' = $C_2H_5$ *) | 1 | 0.5 |
| 5 (comparative) | R with R' = $C_2H_5$ *) | 0.5 | 1 |
| 6 (comparative) | $K_2S_2O_8$ | 0.5 | 1 |
| 7 (comparative) | R with R' = $CH_3$ **) | 1 | 1 |

*)Vazo 67 (DuPont)
**)Vazo 64 (DuPont)

TABLE 2

Test data for the moulding compositions from Examples 1 to 7

| Example | $a_k$ ($kJ/m^2$) | $H_c$ ($N/mm^2$) | Vicat B (° C.) | Filling pressure (bar) |
|---|---|---|---|---|
| 1 | 40.1 | 97 | 101 | 184 |
| 2 | 42.6 | 96 | 101 | 176 |
| 3 | 38.8 | 98 | 100 | 175 |
| 4 (comparative) | 35.5 | 96 | 99 | 185 |
| 5 (comparative) | 35.1 | 99 | 100 | 180 |
| 6 (comparative) | 32.5 | 97 | 100 | 168 |
| 7 (comparative) | 34.6 | 96 | 98 | 175 |

Examples 8 to 12

50 parts by weight (calculated as the solid) of an anionically emulsified polybutadiene latex which was produced by radical polymerisation and which had the composition given in Table 3, were made up with water to a solids content of about 20% by weight, after which the mixture was heated to 63° C. and treated with the initiators given in Table 3. Thereafter, 50 parts by weight of a mixture of 73% by weight styrene and 27% by weight acrylonitrile and 0.15 parts by weight tert-dodecyl mercaptan were added over 4 hours, in such a way that 70% by weight of the total amount of monomers was added to the reaction mixture within the first two hours; in parallel with this, the amounts given in Table 3 (calculated as the solid substance) of the sodium salt of a resin acid mixture (Dresinate 731, dissolved in water made alkaline) were added over 4 hours.

After a subsequent reaction time of 4 hours, the graft latices were each coagulated, after the addition of about 1.0 parts by weight of a phenolic antioxidant, by the addition of a magnesium sulphate/acetic acid mixture, and after washing with water the resulting powders were dried at 70° C. in vacuum.

32 parts by weight of the respective graft polymer were mixed with 68 parts by weight of a styrene/acrylonitrile copolymer resin (72:28, $M_W \approx 15{,}000$, $M_W/M_n - 1 \leq 2$), 2 parts by weight of ethylenediamine-bis-stearylamide and 0.1 parts by weight of a silicone oil in an internal kneader and were subsequently processed to form test bars on which the aforementioned data were determined.

The results are summarised in Table 4.

TABLE 3

Rubber compositions; amounts and type of initiators and emulsifiers added

| Example | Latex A from Examples 1 to 7 [parts by weight] | Latex B from Examples 1 to 7 [parts by weight] | Type of initiator | Amount of initiator [parts by weight] | Amount of emulsifier [parts by weight] |
|---|---|---|---|---|---|
| 8 | 25 | 25 | R with R' = $C_2H_5$ *) | 1 | 1 |
| 9 (comparative) | 25 | 25 | R with R' = $C_2H_5$ *) | 0.3 | 1 |
| 10 (comparative) | 25 | 25 | $K_2S_2O_8$ | 0.5 | 1 |
| 11 (comparative) | 50 | 0 | R with R' = $C_2H_5$ *) | 1 | 1 |
| 12 (comparative) | 0 | 50 | R with R' = $C_2H_5$ *) | 1 | 1 |

*) Vazo 67 (DuPont)

TABLE 4

Test data for the moulding compositions from Examples 8 to 12

| Example | $a_k$ (kJ/m$^2$) | $H_c$ (N/mm$^2$) | Vicat B (° C.) | Filling pressure (bar) |
|---|---|---|---|---|
| 8 | 36.6 | 103 | 102 | 172 |
| 9 (comparative) | 31.8 | 102 | 101 | 173 |
| 10 (comparative) | 25.3 | 103 | 102 | 175 |
| 11 (comparative) | 33.3 | 101 | 102 | 169 |
| 12 (comparative) | 30.5 | 100 | 100 | 170 |

What is claimed is:

1. A thermoplastic moulding composition comprising:
   I) at least one graft polymer obtained by an emulsion polymerisation of styrene and acrylonitrile in a weight ratio of between about 90:10 and 50:50, wherein the styrene and/or the acrylonitrile can be partially replaced by α-methylstyrene, methyl methacrylate or N-phenylmaleinimide, in the presence of at least two butadiene polymer latices of types (A) and (B), wherein each type of butadiene polymer latex contains about 0 to 50% by weight of copolymerised vinyl monomers, and wherein the monomers and the butadiene polymer latices are used in a weight ratio of between about 20:80 and 80:20, and
   II) at least one copolymer of styrene and acrylonitrile in a weight ratio of between about 90:10 and 50:50, wherein the styrene and/or the acrylonitrile can be partially replaced by α-methylstyrene, methyl methacrylate or N-phenylmaleinimide, and wherein
      i) the butadiene polymer latex of the type (A) has a particle diameter $d_{50} \leq 320$ nm and a particle size distribution range of between about 30 and 100 nm when measured as $d_{90}$–$d_{10}$ from the integral particle size distribution, and a gel content $\leq 70\%$ by weight, and wherein the butadiene polymer latex of the type (B) has a particle diameter $d_{50} \leq 370$ nm and a particle size distribution range of between about 50 and 500 nm when measured as $d_{90}$–$d_{10}$ from the integral particle size distribution, and a gel content $\leq 70\%$ by weight, and
      ii) at least one compound having the formula (R):

$$R'-\underset{\underset{CN}{|}}{\overset{\overset{CH_3}{|}}{C}}-N=N-\underset{\underset{CN}{|}}{\overset{\overset{CH_3}{|}}{C}}-R',$$ (R)

wherein R'=$C_2H_5$, $C_3H_7$, and $C_4H_9$ alkyl groups,
      the (R) compound being used in amounts of about 1 to 5% by weight with respect to the monomers as a radical former in a production of the graft polymer, and wherein
      iii) the radical former (R) compound and an emulsifier which is used in the graft polymerisation is in a weight ratio of between about 1:1 and 1:5.

2. The thermoplastic moulding composition according to claim 1, wherein the graft polymerisation is conducted by feeding the monomers into the mixture of the butadiene polymer latices of the types (A) and (B) such that about 55 to 90% by weight of the monomers are added within a first half of the monomer addition period.

3. The thermoplastic moulding composition according to claim 1, further comprising at least one resin selected from the group consisting of an aromatic polycarbonate, an aromatic polyester carbonate, a polyester, and a polyamide.

4. The thermoplastic moulding composition according to claim 1, further comprising a molecular weight regulator compound.

5. The thermoplastic moulding composition according to claim 4, wherein the molecular weight regulator comprises a compound selected from the group consisting of n-dodecyl mercaptan, t-dodecyl mercaptan, dimeric α-methylstyrene and terpineols.

6. A moulding prepared from the thermoplastic moulding composition according to claim 1.

7. The thermoplastic moulding composition according to claim 1, wherein the emulsifier comprises a sodium salt of a resin acid mixture.

8. The thermoplastic moulding composition according to claim 1, wherein the monomers of the at least one graft polymer consist essentially of styrene and acrylonitrile.

9. A thermoplastic moulding composition comprising:
   I) at least one graft polymer obtained by an emulsion polymerisation of styrene and acrylonitrile in a weight ratio of between about 90:10 and 50:50, wherein the styrene and/or the acrylonitrile can be partially replaced by α-methylstyrene, methyl methacrylate or N-phenylmaleinimide, in the presence of at least two butadiene polymer latices of types (A) and (B), wherein each type of butadiene polymer latex contains about 0 to 50% by weight of copolymerised vinyl monomers, and wherein the monomers and the butadiene polymer latices are used in a weight ratio of between about 30:70 and 75:25, and
   II) at least one copolymer of styrene and acrylonitrile in a weight ratio of between about 90:10 and 50:50, wherein the styrene and/or the acrylonitrile can be partially replaced by α-methylstyrene, methyl methacrylate or N-phenylmaleinimide, and wherein
      i) the butadiene polymer latex of the type (A) has a particle diameter $d_{50}$ of 260 to 310 nm and a particle size distribution range of between about 40 and 80 nm when measured as $d_{90}$–$d_{10}$ from the integral particle size distribution, and a gel content of between about 40 and 65% by weight, and wherein the butadiene polymer latex of the type (B) has a particle diameter $d_{50}$ of between about 380 and 450 nm and a particle size distribution range of between about 100 and 400 nm when measured as $d_{90}$–$d_{10}$ from the integral particle size distribution, and a gel content of between about 75 and 90% by weight, and ii) at least one compound having the formula (R):

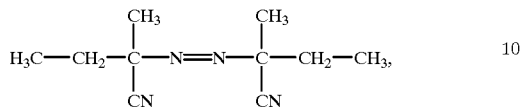

the (R) compound being used in amounts of about 1.5 to 3% by weight with respect to the monomers as a radical former in a production of the graft polymer, and wherein iii) the radical former (R) compound and an emulsifier which is used in the graft polymerisation is in a weight ratio of between about 1:1 and 1:3.

10. The thermoplastic moulding composition according to claim 9, wherein the graft polymerisation is conducted by feeding the monomers into the mixture of butadiene polymer latices of the types (A) and (B) such that about 60 to 80% by weight of the monomers are added within a first half of the monomer addition period.

11. The thermoplastic moulding composition according to claim 9, wherein the emulsifier comprises a sodium salt of a resin acid mixture.

12. The thermoplastic moulding composition according to claim 9, further comprising at least one resin selected from the group consisting of an aromatic polycarbonate, an aromatic polyester carbonate, a polyester, and a polyamide.

13. The thermoplastic moulding composition according to claim 9, further comprising a molecular weight regulator compound.

14. A moulding prepared from the thermoplastic moulding composition according to claim 9.

15. The thermoplastic moulding composition according to claim 9, wherein the monomers of the at least one graft polymer consist essentially of styrene and acrylonitrile.

16. A thermoplastic moulding composition comprising:

I) at least one graft polymer obtained by an emulsion polymerisation of styrene and acrylonitrile in a weight ratio of between about 90:10 and 50:50, wherein the styrene and/or the acrylonitrile can be partially replaced by α-methylstyrene, methyl methacrylate or N-phenylmaleinimide, in the presence of at least two butadiene polymer latices of types (A) and (B), wherein each butadiene polymer latex contains about 0 to 50% by weight of copolymerised vinyl monomers, and wherein the monomers and the butadiene polymer latices are used in a weight ratio of between about 20:80 and 80:20, and II) at least one copolymer of styrene and acrylonitrile in a weight ratio of between about 90:10 and 50:50, wherein the styrene and/or the acrylonitrile can be partially replaced by α-methylstyrene, methyl methacrylate or N-phenylmaleinimide, and wherein i) the butadiene polymer latex of the type (A) has a particle diameter $d_{50} \leq 320$ nm and a particle size distribution range of between about 30 and 100 nm when measured as $d_{90}$–$d_{10}$ from the integral particle size distribution, and a gel content $\leq 70\%$ by weight, and wherein the butadiene polymer latex of the type (B) has a particle diameter $d_{50} \geq 370$ nm and a particle size distribution range of between about 50 and 500 nm when measured as $d_{90}$–$d_{10}$ from the integral particle size distribution, and a gel content $\geq 70\%$ by weight, and ii) at least one compound having the formula (R):

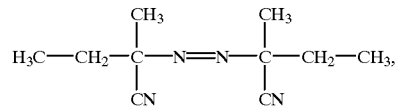

the (R) compound being used in amounts of about 1 to 5% by weight with respect to the monomers as a radical former in a production of the graft polymer, and wherein iii) the radical former (R) compound and an emulsifier which is used in the graft polymerisation is in a weight ratio of between about 1:1 and 1:5.

17. The thermoplastic moulding composition according to claim 16, where in the emulsifier comprises a sodium salt of a resin acid mixture.

18. The thermoplastic moulding composition according to claim 16, further comprising at least one resin selected from the group consisting of an aromatic polycarbonate, an aromatic polyester carbonate, a polyester, and a polyamide.

19. A moulding prepared from the thermoplastic moulding composition according to claim 16.

20. The thermoplastic moulding composition according to claim 16, wherein the monomers of the at least one graft polymer consist essentially of styrene and acrylonitrile.

* * * * *

UNITED STATES PATENT AND TRADEMARK OFFICE
CERTIFICATE OF CORRECTION

PATENT NO.: 5,969,041

DATED: October 19, 1999

INVENTOR(S): Herbert Eichenauer, Adolf Schmidt, Heinrich Alberts

It is certified that error appears in the above-identified patent and that said Letters Patent is hereby corrected as shown below:

Claim 1, line 25, (column 11, line 63), change "$\leq 370$" to --$\geq 370$--.

Claim 1, line 29, (column 11, last line), change "$\leq 70\%$" to --$\geq 70\%$--.

Signed and Sealed this

Eleventh Day of April, 2000

*Attest:*

Q. TODD DICKINSON

*Attesting Officer*  *Director of Patents and Trademarks*